United States Patent
Hanada et al.

(10) Patent No.: US 8,080,267 B2
(45) Date of Patent: Dec. 20, 2011

(54) SOY SAUCE CONTAINING 5'-NUCLEOTIDES AND METHOD FOR PRODUCING THE SAME

(75) Inventors: Yoichi Hanada, Chiba (JP); Ryohei Tsuji, Chiba (JP)

(73) Assignee: Kikkoman Corporation, Noda-shi (JP)

( * ) Notice: Subject to any disclaimer, the term of this patent is extended or adjusted under 35 U.S.C. 154(b) by 686 days.

(21) Appl. No.: 12/064,285

(22) PCT Filed: Sep. 30, 2005

(86) PCT No.: PCT/JP2005/018165
§ 371 (c)(1),
(2), (4) Date: Feb. 20, 2008

(87) PCT Pub. No.: WO2007/043114
PCT Pub. Date: Apr. 19, 2007

(65) Prior Publication Data
US 2008/0241316 A1    Oct. 2, 2008

(51) Int. Cl.
*A23L 1/238*    (2006.01)
(52) U.S. Cl. .................. 426/46; 426/64; 426/589
(58) Field of Classification Search ............ 426/46, 426/64, 589
See application file for complete search history.

(56) References Cited

U.S. PATENT DOCUMENTS

| | | | |
|---|---|---|---|
| 4,303,680 A | 12/1981 | Tanekawa et al. | |
| 5,034,325 A * | 7/1991 | Bowles | 435/199 |

FOREIGN PATENT DOCUMENTS

| | | |
|---|---|---|
| CN | 1130033 A | 9/1996 |
| EP | 0 716 812 B1 | 5/2001 |
| JP | 39 27496 | 12/1964 |
| JP | 53 33661 | 9/1978 |
| JP | 54-41395 | 4/1979 |
| JP | 55 92672 | 7/1980 |
| JP | 58-043760 | * 3/1983 |
| JP | 4 330273 | 11/1992 |
| JP | 2001-299269 | 10/2001 |

OTHER PUBLICATIONS

"Stability of nucleotide (I+G) in soy sauce", China Academic Journal Electronic Publishing House, No. 11, Nov. 1998, 4 pages (with partial English translation).
"Autolysis of thalli", China Academic Journal Electronic Publishing House, pp. 1-5 (with partial English translation).
Extended European Search Report issued Jan. 14, 2011, in Patent Application No. 05788096.5.
Yamamoto Y., et al., "Heat treatment of white soy sauce", Journal of Food Science and Technology, vol. 18, No. 7, XP 002612432, 1971, p. 340 (English Abstract only).
Kwang-Soo Choi, et al., "Effects of methods of adding barley malt in the production of kanjang (Korean traditional soy sauce) on its chemical compositions and sensory characteristics", Journal of the Korean Society of Agricultural Chemistry and Biotechnology, vol. 46, No. 3, XP 002612434, 2003, pp. 195-200 (English Abstract only).

* cited by examiner

*Primary Examiner* — D. Lawrence Tarazano
*Assistant Examiner* — Hamid R Badr
(74) *Attorney, Agent, or Firm* — Oblon, Spivak, McClelland, Maier & Neustadt, L.L.P.

(57) ABSTRACT

The present invention relates to a method for producing a 5'-nucleotide-containing soy sauce characterized in that, in a soy-sauce producing method, malt, germinated rice, or a processed product thereof is added to soy sauce moromi mash with phosphatases derived from microorganisms being inactivated, thereby producing and accumulating 5'-nucleotides; and a 5'-nucleotide-containing soy sauce obtained according to the method.

2 Claims, No Drawings

SOY SAUCE CONTAINING 5'-NUCLEOTIDES AND METHOD FOR PRODUCING THE SAME

TECHNICAL FIELD

The present invention relates to a 5'-nucleotide-containing soy sauce and a method for producing the 5'-nucleotide-containing soy sauce.

BACKGROUND ART

The term "5'-nucleotides" generically refers to a collective term for flavor-enhancing nucleotides including 5'-adenylic acid, 5'-guanylic acid, 5'-inosinic acid, and 5'-xanthylic acid, which is sometimes also referred to as nucleic acid-based seasonings. 5'-nucleotides have a strong flavor-enhancing effect even when used alone. It is known that the addition of 5'-nucleotides into a soy sauce containing L-glutamic acid as an inherent flavor-enhancing ingredient significantly improves and enriches the flavor through a synergistic effect.

However, since soy sauces contain a large amount of phosphatases derived from various microorganisms, even when such flavor-enhancing nucleotides are added to a soy sauce, the nucleotides are dephosphorylated by the action of the phosphatases, and decomposed into nucleosides without flavor-enhancing property.

For example, a raw soy sauce before pasteurization is one that exhibits a particularly strong phosphatase activity, and it is known that flavor-enhancing nucleotides added to the raw soy sauce are substantially decomposed and lost in a day after the addition, resulting in complete loss of the flavor-enhancing property of these nucleotides (Patent Document 1). A raw soy sauce has a considerably strong phosphatase activity, but the soy sauce pasteurized (at 80° C.) on a usual factory scale is also known to have a residual phosphatase activity of about 10 to 25% that of the raw soy sauce.

Therefore, it is necessary to inactivate the phosphatase activity to stably maintain the 5'-nucleotides added into a soy sauce (Patent Document 2).

In conventional methods for producing 5'-nucleotide-containing soy sauces, the phosphatase activity of a soy sauce produced by a common method is inactivated before the addition of 5'-nucleotides. To produce and accumulate 5'-nucleotides in a soy sauce moromi mash (i.e., unrefined soy sauce) juice without the addition of 5'-nucleotides has been considered to be impossible, and hence has not been effected.

On the other hand, methods for producing soy sauces containing a nucleic acid as a flavor-enhancing ingredient are described in some documents. Patent Document 3 discloses a method for producing a rich soy sauce characterized in that a step of preparing moromi mash for naturally brewed soy sauce includes the use of a highly flavor-enhancing liquid obtained by adding water to fermented lees of sake (a Japanese rice wine) or the like and autolyzing the mixture at 50 to 60° C. for 1 to 2 weeks, or a compressed liquid thereof, as shikomi water (water used to prepare moromi mash) added to a raw material after the koji making process. Moreover, Patent Document 4 discloses a method for preparing a liquid seasoning containing various amino acids, nucleic acid-based flavor-enhancing substances, and natural potassium. In this method, distillation residue (or its concentrate) of singly distilled shochu (a Japanese distilled spirit) made from sweet potatoes is mixed with soy sauce koji and aqueous common salt solution, the mixture is placed in a container for fermentation and aging, and the resulting mixture is filtered. However, both of these methods require special ingredients (i.e., sake lees or distillation residue of shochu). Therefore, the resulting soy sauces have the drawback that they taste considerably different from typical brewed soy sauces.

Moreover, the present inventors conducted re-examination of the inventions described in Patent Documents 3 and 4, and found that the resulting soy sauces of both of the inventions are devoid of 5'-nucleotides. This supports the fact that since soy sauces contain a large amount of phosphatases derived from various microorganisms, even when such flavor-enhancing nucleotides are added to a soy sauce, the flavor-enhancing nucleotides are dephosphorylated by the action of the phosphatases, and decomposed into nucleosides without flavor-enhancing property.

Patent Document 1: JP Patent Publication (Kokoku) No. 53-33661 B (1978)
Patent Document 2: JP Patent Publication (Kokoku) No. 39-27496 B (1964)
Patent Document 3: JP Patent Publication (Kokai) No. 54-84097 A (1979)
Patent Document 4: JP Patent Publication (Kokoku) No. 4-62707 B (1992)

DISCLOSURE OF THE INVENTION

The object of the present invention is to produce a 5'-nucleotide-containing soy sauce without externally adding 5'-nucleotides to soy sauce moromi mash.

The present inventors repeatedly conducted extensive research to solve the aforementioned object, thereby accomplishing the present invention. The present invention includes the inventions as set forth below.

(1) A method for producing a 5'-nucleotide-containing soy sauce characterized in that, in a soy-sauce producing method, malt, germinated rice, or a processed product thereof is added to soy sauce moromi mash with phosphatases derived from microorganisms being inactivated, thereby producing and accumulating 5'-nucleotides.

(2) The method according to (1), comprising mixing soy sauce koji with aqueous common salt solution to prepare soy sauce moromi mash; inactivating a phosphatase contained in the moromi mash; subjecting the phosphatase-inactivated soy sauce moromi mash to yeast fermentation; autolyzing a yeast contained in the yeast-fermented soy sauce moromi mash; inactivating a phosphatase contained in the yeast-autolyzed soy sauce moromi mash; and adding malt, germinated rice, or a processed product thereof to the phosphatase-inactivated soy sauce moromi mash to produce and accumulate 5'-nucleotides.

(3) The method according to (2), wherein the step of preparing soy sauce moromi mash comprises mixing soy sauce koji with 200 to 2,000% (W/W) of aqueous common salt solution with respect to the soy sauce koji.

(4) The method according to (2) or (3), further comprising, subsequent to the step of producing and accumulating 5'-nucleotides, inactivating a phosphatase contained in the soy sauce moromi mash containing 5'-nucleotides.

(5) A 5'-nucleotide-containing soy sauce which is produced by the method according to any one of (1) to (4).

(6) A 5'-nucleotide-containing soy sauce which is obtained by producing and accumulating 5'-nucleotides in soy sauce moromi mash in a soy-sauce producing method.

The term "5'-nucleotides" as referred to herein means flavor-enhancing nucleotides including 5'-adenylic acid, 5'-guanylic acid, 5'-inosinic acid, and 5'-xanthylic acid.

In the present invention, yeast fermentation of the soy sauce moromi mash may be conducted with a yeast falling into the soy sauce moromi mash from the air or a yeast naturally mixed into the soy sauce moromi mash from soy sauce koji, or with a yeast inhabiting a fermenter or the like containing the soy sauce moromi mash, or with a yeast artificially added to the soy sauce moromi mash.

Preferably, the soy sauce moromi mash is subjected to lactic acid fermentation in addition to yeast fermentation. Lactic acid fermentation may be conducted with lactic acid bacteria falling into the soy sauce moromi mash from the air or lactic acid bacteria naturally mixed into the soy sauce moromi mash from soy sauce koji, or with lactic acid bacteria inhabiting a fermenter or the like containing the soy sauce moromi mash, or with lactic acid bacteria artificially added to the soy sauce moromi mash.

In accordance with the present invention, a 5'-nucleotide-containing soy sauce can be produced by producing and accumulating 5'-nucleotides in soy sauce moromi mash without externally adding 5'-nucleotides into the soy sauce moromi mash.

BEST MODE FOR CARRYING OUT THE INVENTION

The present invention will be described in detail below.
(Preparation of Soy Sauce Koji)

Soy sauce koji is prepared first in the same manner as in a typical method of brewing soy sauce. A specific example of the method comprises mixing a protein ingredient obtained by heat-denaturation of soybeans, de-fatted soybeans, wheat gluten, or the like with a starch ingredient obtained by heat-denaturation of wheat, barley, rice, rye, adlay, or the like; adjusting the water content of the mixture to 35 to 45% (W/W); inoculating the resulting mixture with a koji mold of species such as *Aspergillus sojae, Aspergillus oryzae*, or the like; and culturing the inoculated mixture at 25 to 35° C. for 3 to 4 days to prepare soy sauce koji.

Although the proportion of the protein ingredient to the starch ingredient is not particularly limited, it is preferable that the protein ingredient is 1 to 30% by weight, with the remainder being the starch ingredient, i.e., 99 to 70% by weight.
(Preparation of Soy Sauce Moromi Mash)

Soy sauce moromi mash is next prepared. Soy sauce moromi mash is obtained by mixing soy sauce koji with aqueous common salt solution. In the present invention, soy sauce koji is mixed with aqueous common salt solution at a ratio of 100:200 to 2,000% (W/W). In a typical method of brewing soy sauce, the weight ratio of soy sauce koji to aqueous common salt solution is 100:about 120 to about 180. In the present invention, the ratio of soy sauce koji to aqueous common salt solution is important. If the ratio of aqueous common salt solution is less than 200%, 5'-nucleotides cannot be successfully produced and accumulated; in contrast, if the ratio exceeds 2,000%, 5'-nucleotides cannot also be successfully produced and accumulated. On the other hand, when the ratio of aqueous common salt solution to soy sauce koji is 200 to 2,000% (W/W), the yeast grows and propagates very rapidly, and 5'-nucleotides are produced and accumulated smoothly.

The aqueous common salt solution for use in the invention preferably provides a common salt concentration of 5 to 20% by weight (W/V), more preferably 7 to 17%, and most preferably 8 to 14% in a filtrate obtained when the soy sauce moromi mash obtained by mixing soy sauce koji with aqueous common salt solution is compressed.

One or more ingredients selected from saccharides such as sugar, grape sugar, high fructose corn syrups, starch syrup, malt sugar, and the like are preferably added to the soy sauce moromi mash, because the yeast can then be grown rapidly, and 5'-nucleotides can be produced and accumulated smoothly.
(Inactivation of Koji-Derived Phosphatase)

The moromi mash is heated at a temperature of 80° C. or higher to thereby inactivate the phosphatase derived from the koji mold. That is to say, the digested moromi mash is preferably heated at 130 to 80° C. for 2 seconds to 15 minutes. A heating temperature of lower than 80° C. will result in insufficient inactivation of the phosphatase derived from the koji mold; in contrast, a heating temperature exceeding 130° C. is not preferable because it causes coloration of the soy sauce moromi mash to proceed.

At a low heating temperature, the processing time is preferably long, whereas at a high heating temperature, the processing time is preferably short.
(Preparation of Yeast-Fermented Soy Sauce Moromi Mash)

Yeast fermentation is conducted by culturing and growing a yeast in the soy sauce moromi mash obtained by mixing soy sauce koji with aqueous common salt solution.

In the specification, the soy sauce moromi mash that has been subjected to yeast fermentation is referred to as "yeast-fermented soy sauce moromi mash". The term "yeast-fermented soy sauce moromi mash" is not limited to soy sauce moromi mash in which the alcohol content has reached a constant value, i.e., soy sauce moromi mash after the completion of yeast fermentation, but also includes soy sauce moromi mash with a rising alcohol content, i.e., soy sauce moromi mash in the course of yeast fermentation.

The yeast for use in the yeast fermentation of the present invention is preferably a salt-tolerant soy sauce yeast that can be grown rapidly in soy sauce moromi mash with a common salt concentration as high as 10 to 20% (W/W). Examples of soy sauce yeasts include *Zygosaccharomyces rouxii, Candida* (*Torulopsis*) yeasts, *C. etchellsii*, and *C. verstilis*.

A pre-cultured yeast is preferably added to the soy sauce moromi mash so that there are $1 \times 10^3$ to $1 \times 10^7$ cells per 1 g of the moromi mash. If the amount of the yeast is too small, moromi mash with a high 5'-nucleotide content cannot be easily obtained; in contrast, if the amount is too large, the cost will be expensive and will not be economical.

Instead of artificially adding a pre-cultured yeast, a yeast falling into the soy sauce moromi mash from the air or a yeast naturally mixed into the soy sauce moromi mash from soy sauce koji, or a salt-tolerant soy sauce yeast inhabiting a fermenter or the like containing the soy sauce moromi mash (a wild yeast) can also be used.

Yeast culturing is preferably conducted under aerobic conditions such as intermittent or continuous aerobic culturing, agitation culturing, or aeration agitation culturing. Although the culturing temperature and time are not particularly limited, the yeast is preferably cultured at a material temperature of 20 to 35° C. for 10 hours to 30 days, and in particular, for 12 to 72 hours.

In the present invention, the soy sauce moromi mash is preferably subjected to lactic acid fermentation in addition to yeast fermentation. Lactic acid fermentation is conducted either prior to, or simultaneously with, yeast fermentation. Examples of lactic acid bacteria that can be used in lactic acid fermentation include typical salt-tolerant soy sauce lactic acid bacteria, such as *Pediococcus halophilus* and the like.

Lactic acid fermentation is conducted by adding lactic acid bacteria to the soy sauce moromi mash so that there are $1 \times 10^3$ to $1 \times 10^6$ cells per gram of the moromi mash, and then maintaining the moromi mash at a moromi mash temperature of 13 to 35° C. for 1 to 40 days.

(Autolysis of the Yeast in Yeast-Fermented Soy Sauce Moromi Mash)

The yeast in the yeast-fermented soy sauce moromi mash is subsequently autolyzed to dissolve RNA from the yeast. Autolysis can be conducted by heating the yeast-fermented soy sauce moromi mash for a certain period of time. Autolysis is conducted, for example, under sufficient conditions to allow maximum dissolution of the yeast-derived RNA, and preferably, for example, at a temperature of 40 to 60° C. for 3 to 72 hours. If the temperature is less than 40° C., autolysis will require a considerable time, and the dissolution of the yeast-derived RNA into the moromi juice will not be sufficient; in contrast, if the temperature exceeds 60° C., an odor derived from warm brewing (off-odor) will be imparted to the moromi juice, which is not preferable. If the time is less than 3 hours, the dissolution of the yeast-derived RNA is insufficient; whereas if the time exceeds 72 hours, an off-odor will be imparted to the moromi mash, which is not preferable.

(Heating of Autolyzed Soy Sauce Moromi Mash)

The yeast-autolyzed soy sauce moromi mash is then heated at a temperature of 80° C. or higher to thereby inactivate phosphatases derived from microorganisms such as a koji mold, yeast, lactic acid bacteria, and unwanted bacteria. That is to say, the yeast-autolyzed soy sauce moromi mash is preferably heated at 130 to 80° C. for 2 seconds to 15 minutes. If the heating temperature is less than 80° C., the inactivation of the yeast-derived phosphatase will not be sufficient, whereas if it exceeds 130° C., the coloration of the soy sauce moromi mash will proceed, which is not preferable. At a low heating temperature, the processing time is preferably long, whereas at a high heating temperature, the processing time is preferably short.

(Addition of Malt, Germinated Rice, or Processed Product Thereof)

Malt, germinated rice, or a processed product thereof is added to the phosphatase-inactivated soy sauce moromi mash obtained by the above procedure. In this step, RNA is decomposed to form 5'-nucleotides by the action of the enzyme contained in the malt, germinated rice, or processed product thereof.

The malt for use in the invention is obtained by allowing barley (including rye), wheat, adlay or the like to root and germinate by supplying it with water (42 to 48% (W/W)) and air. For example, barley malt can be obtained as follows. Barley is immersed in water at a temperature of 10 to 25° C. for 40 to 50 hours and then water is drained. The drained barley is subsequently germinated by, for example: (1) a flooring method in which the barley is deposited to a thickness of 3 to 15 cm on a flat plate or a concrete floor, and allowed to germinate (at 10 to 25° C. for 7 to 10 days) with occasional stirring; (2) a drum germination method in which the barley is introduced into a cylindrical steel, horizontal germination drum, and allowed to germinate while rotating the drum slowly; or (3) a box germination method in which a 16-20 m long, 4-5 m wide concrete tank is provided with a steel plate with holes at a height of 40 to 60 cm from the tank bottom, and the barley is deposited on the floor to a thickness of about 60 cm, and allowed to germinate while passing moisture-saturated air through the barley tank. Germination is terminated when the length of leaf buds has become about ⅔ the length of the grain, resulting in the barley malt for use in the invention.

The malt after the germination operation will be referred to as "green malt". Green malt has a water content of 40 to 45%. In the present invention, it is preferable to use a processed product obtained by heat-treating the green malt at 60 to 80° C. for 10 minutes to 10 hours, drying the heat-treated green malt at 50° C. or lower until the water content decreases to 10% or lower, and crushing the dried green malt. Such a malt-processed product is preferable because it exhibits a high 5'-phosphodiesterase activity, which is advantageous in producing and accumulating 5'-nucleotides, while exhibiting a very low phosphatase activity. A phosphatase activity is disadvantageous in producing and accumulating 5'-nucleotides.

Germinated rice can be obtained by immersing unhulled rice or brown rice in water, draining water therefrom, and then processing the resulting rice in the same manner as in the preparation of malt. It is preferable to use, as a processed product of germinated rice, a processed product obtained by heat-treating the germinated rice at 60 to 80° C. for 10 minutes to 10 hours, drying the heat-treated germinated rice at 50° C. or lower until the water content decreases to 10% or lower, and crushing the dried germinated rice.

The amount of the malt, germinated rice, or processed product thereof added to the soy sauce moromi mash is preferably 1 to 20% (W/W) relative to the moromi mash. The unit "% (W/W)" as referred to herein is the percentage of the dry weight amount of the malt, germinated rice, or processed product thereof relative to the wet weight amount of the soy sauce moromi mash.

If the amount is less than 1% (W/W), the decomposition of RNA by 5'-phosphodiesterase may become slow, whereas if the amount exceeds 20% (W/W), the soy sauce flavor may deteriorate, which is not preferable.

The RNA decomposition reaction in the soy sauce moromi mash via 5'-phosphodiesterase contained in the malt, germinated rice, or processed product thereof is preferably conducted at a moromi mash temperature of 55 to 75° C. and at a pH of 5.5 to 8.5 for 3 to 24 hours. If the temperature during the reaction is less than 55° C., digestive decomposition will become slow, and a considerable time will be required. In contrast, a temperature exceeding 75° C. is not preferable because 5'-phosphodiesterase will be inactivated. If the reaction time is less than 3 hours, 5'-nucleotides will not be produced and accumulated sufficiently in the soy sauce moromi mash; in contrast, if it exceeds 24 hours, the coloration of the moromi mash will occur, and an off-odor will be imparted to the moromi mash, which is not preferable. If the pH during the reaction is less than 5.5, the enzymolysis will become slow, and a considerable time will be required. In contrast, if the pH exceeds 8.5, the amount of organic acid subsequently added to return the pH of the soy sauce near the original value (pH 4.7 to 5.3) increases, which is not preferable.

The 5'-nucleotide-containing soy sauce moromi mash thus obtained by the action of the malt, germinated rice, or processed product thereof can be used as it is in the subsequent step; however, it may also be used in the subsequent step after adjusting the pH to 4.7 to 5.0 with an acidulant (such as hydrochloric acid, lactic acid, or acetic acid), as required. The pH adjustment is preferable because a soy sauce with an excellent flavor can thus be obtained.

(Heating of 5'-Nucleotide-Containing Soy Sauce Moromi Mash)

The 5'-nucleotide-containing soy sauce moromi mash obtained by the above procedure contains a phosphatase derived from the malt, germinated product or processed product thereof. Therefore, it is heat-treated to inactivate the phosphatase.

It is particularly preferable that the heat treatment is conducted at 80 to 130° C. for 2 seconds to 15 minutes. If the heating temperature is 80° C. or lower, the inactivation of the phosphatase derived from the soy sauce koji will not be sufficient, whereas if it exceeds 130° C., the coloration of the soy sauce moromi mash will proceed, which is not preferable. Without a heat treatment, there will be the problem that the 5'-nucleotides produced and accumulated in the soy sauce moromi mash are decomposed and lost.

The 5'-nucleotide-containing soy sauce moromi mash after the heat treatment can subsequently be compressed and filtered according to a common method, resulting in a soy sauce with a high 5'-nucleotide content.

EXAMPLES

The present invention will hereinafter be described in more detail with reference to Examples.

In Examples 1, 2, and 3 described below, 5'-AMP and 5'-GMP were measured according to the following method of analyzing 5'-nucleotides using the HPLC method.
(Method of Analyzing 5'-Nucleotides)
Column used: YMC Pack Polyamine 4.6×250 mm (manufactured by YMC Co., Ltd.)
Eluent: 0.03 M $KH_2PO_4$ 70%, $CH_3CN$ 30%
Flow rate: 1.2 ml/min
Upper pressure limit: 150 Kgf/cm$^2$
Wavelength: 254 nm An undiluted soy sauce or a 10-fold diluted soy sauce was used as an HPLC sample.

The analytical values of soy sauce ingredients were determined according to a method described in "*Shoyu Shiken Ho* (Soy Sauce Testing Method)" (published on Mar. 1, 1985), edited by Japan Soy Sauce Research Institute.

Example 1

(1) (Preparation of Soy Sauce Koji)

Soy sauce koji was prepared from a mixture of raw wheat and de-fatted soybeans at a ratio of 99 to 1% (W/W). More specifically, 99 parts by weight of raw wheat was roasted and crushed according to a common method; 1 part by weight of de-fatted soybeans was soaked in 120% (W/W) of water and steamed; and then both of the resultants were mixed. Water was poured onto the resulting mixture to obtain a morikomi raw material (a mixture for preparing soy sauce koji) with a water content of 40% (W/W). The morikomi raw material was inoculated with a koji mold for making soy sauce according to a common method, and the inoculated mixture was subjected to a koji making process for 72 hours in an aerated koji-making apparatus to thereby obtain soy sauce koji.
(2) (Preparation of Lactic Acid-Fermented Soy Sauce Moromi Mash Samples)

Aqueous common salt solution with different concentrations was mixed with each portion of 100 parts by weight of the thus-obtained soy sauce koji so that the proportions of shikomi water (water used to prepare moromi mash) were as shown in Table 1 below. Soy sauce moromi mash samples with a common salt concentration of 14% (W/V) were thus prepared. A certain amount of each soy sauce moromi mash sample was then placed in a shikomi container (a container in which the moromi mash is subjected to the subsequent process). The raw material was then subjected to dissolution at a moromi mash temperature of 15° C. according to a common method, and subjected to lactic acid fermentation for about a month to obtain each lactic acid-fermented moromi mash sample.
(3) (Preparation of Yeast-Fermented Soy Sauce Moromi Mash Samples)

The thus-obtained lactic acid-fermented soy sauce moromi mash samples were heated at 90° C. for 10 minutes to inactivate the phosphatase derived from the soy sauce koji.

A pre-cultured soy sauce yeast (*Zygosaccharomyces rouxii*) was then added to each lactic acid-fermented soy sauce moromi mash sample so that there were 1×10$^7$ cells per gram of the moromi mash. Each mixture was then homogeneously agitated (100 rpm) at a soy sauce moromi mash temperature of 30° C. in a vertical agitator with a rotating shaft equipped with a propeller, while passing air (0.5 vvm) through the bottom for 20 hours, thereby obtaining each yeast-fermented soy sauce moromi mash sample.
(4) (Autolysis of the Yeast in Yeast-Fermented Soy Sauce Moromi Mash Samples)

The yeast-fermented soy sauce moromi mash samples were heated to 50° C., and digested at that temperature for 24 hours to autolyze the yeast.
(5) (Heating of Autolyzed Soy Sauce Moromi Mash Samples)

The yeast-autolyzed soy sauce moromi mash samples were heated again at 90° C. for 10 minutes to inactivate the yeast-derived phosphatase.
(6) (Addition of Malt-Processed Product)

Green malt prepared according to a common method was heat-treated at 70° C. for 60 minutes, dried with a dryer at 50° C. or lower, and crushed to prepare a processed product.

The processed product was added in an amount of 15% (W/W) to each phosphatase-inactivated soy sauce moromi mash sample.

After the addition of the processed product, each reaction solution was maintained at 63° C. for 6 hours to allow the RNA decomposition reaction to proceed, thereby obtaining 5'-nucleotide-containing soy sauce moromi mash samples.
(7) (Heating of 5'-Nucleotide-Containing Soy Sauce Moromi Mash Samples)

The 5'-nucleotide-containing soy sauce moromi mash samples were then heated at 90° C. for 10 minutes to inactivate the malt-derived phosphatase. The soy sauce moromi mash samples after the inactivation of the malt-derived phosphatase were compressed with a filter cloth to obtain various types of 5'-nucleotide-containing soy sauces.

TABLE 1

| Items Classification | Types of the Present Invention and Comparative Examples | Proportion of Shikomi Water to Soy Sauce Koji % (W/W) | Concentration of 5'-Guanylic Acid (ppm) |
| --- | --- | --- | --- |
| 1 | Comparative Example 1 | 50 | 0 |
| 2 | Comparative Example 2 | 150 | 0 |
| 3 | Present Invention | 200 | 3 |
| 4 | Present Invention | 350 | 15 |
| 5 | Present Invention | 700 | 50 |
| 6 | Present Invention | 1000 | 72 |
| 7 | Present Invention | 1400 | 40 |
| 8 | Present Invention | 2000 | 10 |
| 9 | Comparative Example 3 | 2500 | 0 |

It can be seen from the results shown in Table 1 that where the ratio of aqueous common salt solution to soy sauce koji is less than 200%, 5'-nucleotides cannot be successfully produced and accumulated.

It can also be seen that where the ratio of aqueous common salt solution to soy sauce koji exceeds 2,000%, 5'-nucleotides cannot be successfully produced and accumulated, as with the case above.

In contrast, it can be seen that where the ratio of aqueous common salt solution to soy sauce koji is 200 to 2,000% (W/W), 5'-nucleotides can be produced and accumulated smoothly, and in particular, where the ratio is 350 to 2000% (W/W), soy sauces with very high 5'-guanylic acid contents can be obtained.

Example 2

(1) (Preparation of Soy Sauce Koji)

Soy sauce koji was prepared from a mixture of raw wheat with de-fatted soybeans at a ratio of 75 to 25% (W/W). More specifically, 75 parts by weight of raw wheat was roasted and crushed according to a common method; 25 parts by weight of de-fatted soybeans was soaked in 120% (W/W) of water and steamed; and then both of the resultants were mixed. Water was poured onto the resulting mixture to obtain a morikomi raw material with a water content of 43% (W/W). The morikomi raw material was inoculated with a koji mold for making soy sauce according to a common method, and the inoculated mixture was subjected to a koji making process for 72 hours in an aerated koji-making apparatus to thereby obtain soy sauce koji.

(2) (Preparation of Lactic Acid-Fermented Soy Sauce Moromi Mash)

One-hundred parts by weight of the resulting soy sauce koji were mixed with 600 parts by weight of aqueous common salt solution to prepare soy sauce moromi mash, and the soy sauce moromi mash was placed in a shikomi container. The aqueous common salt solution had a common salt concentration such that the common salt concentration of the soy sauce moromi mash was 13% (W/V). The raw material was then subjected to dissolution at a moromi mash temperature of 15° C. according to a common method, and subjected to lactic acid fermentation for about a month to obtain lactic acid-fermented moromi mash with a pH of 5.3.

Thereafter, the steps of:
(3) (preparing yeast-fermented soy sauce moromi mash);
(4) (autolyzing the yeast in the yeast-fermented soy sauce moromi mash);
(5) (heating the autolyzed soy sauce moromi mash);
(6) (adding a malt processed product); and
(7) (heating the 5'-nucleotide-containing soy sauce moromi mash)

were sequentially performed according to the same method as in the production of a 5'-nucleotide-containing soy sauce in Example 1, thereby obtaining moromi mash in which the malt-derived phophatase had been inactivated.

Common salt was then added (supplemental salt) to the soy sauce moromi mash after the step (7) above. The soy sauce moromi mash was subsequently aged at 20° C. for 2 months, and the flavor was adjusted. The resulting soy sauce moromi mash was then compressed with a filter cloth to obtain a 5'-nucleotide-containing soy sauce.

Table 2 shows the analytical values of ingredients of the 5'-nucleotide-containing soy sauce obtained as above.

TABLE 2

| 5'-AMP | 45 ppm |
| 5'-GMP | 48 ppm |
| Common salt | 18.0% (W/V) |
| Total Nitrogen | 0.5% (W/V) |
| Reduced Sugar | 4.0% (W/V) |
| Alcohol | 1.0% (V/V) |
| Total Acids | 0.3% (W/V) |

The results of Example 2 above show that in the present invention, also when the soy sauce koji produced by mixing raw wheat with de-fatted soybeans at a ratio of 75 to 25% (W/W) is used, 5'-nucleotides can be incorporated and accumulated in the soy sauce moromi mash without the addition of 5'-nucleotides, thereby obtaining a soy sauce containing 5'-nucleotides.

Example 3

(1) First Step (Step of Preparing Soy Sauce Koji)

Ninety-nine parts by weight of raw wheat was roasted and crushed according to a common method; 1 part by weight of de-fatted soybeans was soaked in 120% (W/W) of water and steamed; and then both of the resultants were mixed. Water was poured onto the resulting mixture to obtain a morikomi raw material with a water content of 40% (W/W). The resulting morikomi raw material was inoculated with a koji mold for making soy sauce according to a common method, and the inoculated mixture was subjected to a koji making process for 72 hours in an aerated koji-making apparatus to thereby obtain soy sauce koji.

(2) Second Step (Step of Preparing Soy Sauce Moromi Mash)

One-hundred parts by weight of the resulting soy sauce koji were mixed with 900 parts by weight of aqueous common salt solution to prepare soy sauce moromi mash at a temperature of 42° C., and the soy sauce moromi mash was placed in a shikomi container. The aqueous common salt solution had a common salt concentration such that the common salt concentration of the soy sauce moromi mash was 8% (W/V).

(3) Third Step (Step of Preparing Phosphatase-Inactivated Moromi Mash)

The moromi mash was then heated at 42° C. for 24 hours to allow the soy sauce koji to be hydrolyzed (digested) to obtain moromi mash with a pH of 5.4 in which the soy sauce koji had been digested. The thus-obtained moromi mash in which the soy sauce koji had been digested was then heated at 120° C. for 3 minutes to obtain soy sauce moromi mash in which the phosphatase derived from the soy sauce koji had been inactivated.

(4) Fourth Step (Preparation of Yeast-Fermented Soy Sauce Moromi Mash)

A soy sauce yeast (*Zygosaccharomyces rouxii*) was then added to the soy sauce moromi mash so that there were $1 \times 10^7$ cells per gram of the moromi mash. The mixture was then homogeneously agitated (100 rpm) at a moromi mash temperature of 30° C. in a vertical agitator with a rotating shaft equipped with a propeller, while passing air (0.5 vvm) through the bottom for 20 hours, thereby obtaining yeast-fermented soy sauce moromi mash.

(5) Fifth Step (Autolysis of the Yeast in Yeast-Fermented Soy Sauce Moromi Mash)

The yeast-fermented soy sauce moromi mash was then heated to 50° C., and maintained at that temperature for 24 hours to autolyze the yeast.

(6) Sixth Step (Heating of Autolyzed Soy Sauce Moromi Mash)

The yeast-autolyzed soy sauce moromi mash was then heated again at 90° C. for 10 minutes to inactivate the yeast-derived phosphatase.

(7) Seventh Step (Addition of Malt Processed Product)

Green malt prepared according to a common method was heat-treated at 70° C. for 60 minutes, dried with a dryer at 50° C. or lower, and crushed to prepare a processed product.

The processed product was added in an amount of 15% (W/W) to the phosphatase-inactivated soy sauce moromi mash.

After the addition of the processed product, the reaction solution was maintained at 63° C. for 6 hours to allow the RNA decomposition reaction to proceed, thereby obtaining 5'-nucleotide-containing soy sauce moromi mash.

(8) Eighth Step (Heating of 5'-Nucleotide Containing Soy Sauce Moromi Mash)

The 5'-nucleotide-containing soy sauce moromi mash was then heated at 90° C. for 10 minutes to inactivate the malt-derived phosphatase.

The soy sauce moromi mash after the inactivation of the malt-derived phosphatase was then compressed with a filter cloth to obtain a soy sauce containing 155 ppm of 5'-nucleotides, that is, 75 ppm of 5'-AMP and 80 ppm of 5'-GMP.

Comparative Example 1

A soy sauce according to Comparative Example 1 was obtained following the same procedure as in Example 3 above, except that the third step (the step of preparing phosphatase-inactivated moromi mash), in which the soy sauce moromi mash was heated at 120° C. for 3 minutes to inactivate the phosphatase derived from the soy sauce koji, was excluded.

Comparative Example 2

A soy sauce according to Comparative Example 2 was obtained following the same procedure as in Example 3 above, except that the sixth step (heating of the autolyzed soy sauce moromi mash), in which the soy sauce moromi mash was heated at 90° C. for 10 minutes, was excluded.

Comparative Example 3

A soy sauce according to Comparative Example 3 was obtained following the same procedure as in Example 3, except that the seventh step (addition of a malt processed product), in which a malt processed product was added, was excluded.

The four types of soy sauces obtained according to Example 1 and Comparative Examples 1, 2 and 3 were analyzed for their 5'-nucleotide contents.

The results are shown in Table 3.

The results of Table 3 show that, in the present invention, the third step of inactivating the phosphatase derived from the soy sauce koji, the sixth step of inactivating the yeast-derived phosphatase subsequent to the autolysis of the yeast, and the seventh step of adding a malt processed product are all very important, and that a soy sauce containing 5'-nucleotides in accordance with the present invention cannot be obtained without any of these steps.

INDUSTRIAL APPLICABILITY

According to the present invention, a soy sauce containing 5'-nucleotides can be obtained from typical soy sauce ingredients without the use of special ingredients (such as sake lees or distillation residue of shochu). The method of the present invention can thus be used to produce various types of soy sauces, such as koikuchi (dark) soy sauce, usukuchi (light) soy sauce, shiro (clear) soy sauce, tamari soy sauce, and soy sauce-like seasonings.

All of the publications, patents and patent applications cited in the specification are incorporated herein in their entirety by reference.

The invention claimed is:

1. A method for producing a 5'-nucleotide-containing soy sauce, the method comprising:

heating a soy sauce moromi mash at 130 to 80° C. for 2 seconds to 15 minutes, thereby inactivating all phosphatases contained in the soy sauce moromi mash, and then adding malt, germinated rice, or a processed product thereof to the soy sauce moromi mash, thereby producing and accumulating 5'-nucleotides in the soy sauce, wherein the method comprises mixing soy sauce koji with an aqueous common salt solution, thereby preparing a soy sauce moromi mash; inactivating all phosphatases contained in the soy sauce moromi mash by heating the soy sauce moromi mash at 130 to 80° C. for 2 seconds to 15 minutes; adding soy sauce yeast to the phosphatase-inactivated soy sauce moromi mash, and then subjecting the phosphatase-inactivated soy sauce moromi mash to yeast fermentation; autolyzing the yeast contained in the yeast-fermented soy sauce moromi mash at a temperature of 40 to 60° C. for 3 to 72 hours; inactivating all phosphatases derived from the soy sauce yeast contained in the yeast-autolyzed soy sauce moromi mash by heating at 130 to 80° C. for 2 seconds to 15 minutes; and adding malt, germinated rice, or a processed product thereof to the phosphatase-inactivated soy sauce moromi mash, thereby producing and accumulate 5'-nucleotides in the soy sauce, and

TABLE 3

| Classification | Third Step of Inactivating Koji-Mold Phosphatase | Fourth Step of Yeast Fermentation | Fifth Step of Autolyzing Yeast | Sixth Step of Inactivating Yeast Phosphatase | Seventh Step of Adding Malt Processed Product | 5'-Nucleotides (Note 1) |
|---|---|---|---|---|---|---|
| Present Invention | ○ | ○ | ○ | ○ | ○ | 155 ppm |
| Comparative Example 1 | x | ○ | ○ | ○ | ○ | ND (Note 2) |
| Comparative Example 2 | ○ | ○ | ○ | x | ○ | ND (Note 2) |
| Comparative Example 3 | ○ | ○ | ○ | ○ | x | ND (Note 2) |

Note 1: "5'-Nucleotides" denotes the total concentration of 5'-AMP and 5'-GMP.
Note 2: "ND" means "below the detection limit".

wherein the preparing soy sauce moromi mash comprises mixing soy sauce koji with 200 to 2000% (W/W) of the aqueous common salt solution with respect to the soy sauce koji.

2. The method according to claim 1, further comprising, subsequent to the producing and accumulating 5'-nucleotides, inactivating all phosphatases derived from the malt, germinated rice, or the processed product thereof by heating at 130 to 80° C. for 2 seconds to 15 minutes.

* * * * *